US012739948B2

(12) United States Patent
Schlipf

(10) Patent No.: US 12,739,948 B2
(45) Date of Patent: Sep. 15, 2026

(54) ELECTRIC HEATER AND METHOD OF MAKING AN ELECTRIC HEATER

(71) Applicant: Türk & Hillinger GmbH, Tuttlingen (DE)

(72) Inventor: Andreas Schlipf, Tuttlingen (DE)

(73) Assignee: TURK & HILLINGER GMBH, Tuttlingen (DE)

( * ) Notice: Subject to any disclaimer, the term of this patent is extended or adjusted under 35 U.S.C. 154(b) by 1330 days.

(21) Appl. No.: 17/476,234

(22) Filed: Sep. 15, 2021

(65) Prior Publication Data

US 2022/0110191 A1 Apr. 7, 2022

(30) Foreign Application Priority Data

Oct. 5, 2020 (DE) ..................... 10 2020 126 010.5

(51) Int. Cl.
*H05B 3/48* (2006.01)

(52) U.S. Cl.
CPC ...................................... *H05B 3/48* (2013.01)

(58) Field of Classification Search
CPC ...... H05B 3/48; H05B 3/06; H05B 2203/017; H05B 3/40
See application file for complete search history.

(56) References Cited

U.S. PATENT DOCUMENTS 3,234,633 A * 2/1966 Baxter ..................... H05B 3/52 29/621
3,716,693 A * 2/1973 Bleckmann .............. H05B 3/48 338/238
4,112,577 A * 9/1978 Mann ...................... F23Q 7/001 361/266
4,697,069 A * 9/1987 Bleckmann .............. H05B 3/48 219/544
5,581,872 A * 12/1996 Miyadai ................... H05B 3/48 29/613
2004/0188408 A1* 9/2004 Kumada ................ F23Q 7/001 219/270
2017/0347716 A1 12/2017 Tucker et al.

FOREIGN PATENT DOCUMENTS

| | | | |
|---|---|---|---|
| CN | 108633115 | A | 10/2018 |
| CN | 110461049 | A | 11/2019 |
| DE | 1465025 | A1 | 10/1969 |
| EP | 0438097 | A1 | 7/1991 |

OTHER PUBLICATIONS

German Office Action in Application No. DE 10 2020 126 010.5 Dated Sep. 13, 2024.
Chinese Office Action dated Feb. 19, 2025 in Chinese Patent Application No. 202111121627.9.

* cited by examiner

*Primary Examiner* — Tiffany T Tran
(74) *Attorney, Agent, or Firm* — Panitch Schwarze Belisaroo & Nadel LLP

(57) ABSTRACT

An electric heater with a tubular metal jacket and an electric heating element, which is embedded in the interior of the tubular metal jacket in an electrically insulating material and is coiled at least in some sections. The electric heating element has at least one unheated end section, wherein the unheated end section has, on its side, one or more shaped coils of the electric heating element and at least one tubular section of a pipe made from electrically conductive material. The unheated end section has a fill opening for the electrically insulating materials and a method of making such an electric heater.

12 Claims, 9 Drawing Sheets

210
211

210
211
220
220

210
211
220
212
213
X
Detail X 211
212
220
D1
D2

510

520
510
520

510
511
512
513
520

ELECTRIC HEATER AND METHOD OF MAKING AN ELECTRIC HEATER

CROSS-REFERENCE TO RELATED APPLICATIONS

This application claims priority under 35 U.S.C. § 119(b) to German Application No. 10 2020 126 010.5, filed on Oct. 5, 2020, the disclosure of which is incorporated herein by reference in its entirety.

BACKGROUND OF THE INVENTION

Electric heaters for heating objects or media are widely used. In particular, electric heaters operated at low voltages, for example, in the automotive field at the on-board voltage of a passenger car, use high currents when the electric heater is in operation.

In a large number of applications, it is also desirable for the heated area of the electric heater to be as precisely defined as possible. To achieve this, connecting pins made from a material with a significantly lower resistivity than that of the material of the electric heating element, which in many cases is designed as a coiled resistive wire, are usually used and attempts are made to maximize its cross-sectional surface area. Typically, these connecting pins have been inserted at the end sections of the electric heating element into its coiled interior and an electrically conductive connection is made between the components.

At the same time, in many cases there is the need to make the electric heater as compact as possible, which results in particular in the distance between the tubular metal jacket and the coils of the electric heating element becoming small. However, in combination with the use of connecting pins, problems then arise when filling the electrically insulating material into the interior of the tubular metal jacket. In such cases, it has not been possible to achieve as high a level of process reliability during manufacture as would actually be desirable, with, on one hand, the process reliability during filling and, on the other hand, the process reliability during the manufacture of the electrically conductive connection being unsatisfactory. In addition, the effort to find a feasible compromise between the cross-sectional area of the connecting pin and the available filling gap can lead to a situation where, in the case of high currents, this embodiment can still result in excessive heating power being applied to the connecting pins.

The task of the invention is therefore to provide an electric heater that can be manufactured with improved process reliability and to specify a more process-reliable method of making such an electric heater.

BRIEF SUMMARY OF THE INVENTION

This task is solved by an electric heater preferably having the features of the electric heater with tubular metal jacket and an electric heating element described herein and a method having the features of making an electric heater with a tubular metal jacket and an electric heating element, as described herein. Advantageous further developments of the invention are the subject of the respective dependent patent claims.

The electric heater according to the invention has a tubular metal jacket and an electric heating element which is arranged in the interior of the tubular metal jacket embedded in an electrically insulating material and is coiled at least in some sections.

Particularly preferred is an electric heating element formed from a resistive wire with a flat ribbon-shaped cross section. In this context, it is advantageous if the flat ribbon material of the resistive wire has a width that is at least three times (3×) as large as its thickness; a factor of five times (5×) is preferred, and a factor of eight times (8×) is particularly preferred. The thickness of the flat ribbon material is thereby its smallest dimension, the width is the second smallest dimension of the flat ribbon or the flat ribbon-shaped cross section of the resistive wire.

It is preferred that the electric heating element has at least one unheated end section, wherein the unheated end section has, in turn, one or more shaped coils of the electric heating element and at least one tubular section of a pipe made from electrically conductive material, preferably copper, mild steel, nickel-plated mild steel or nickel, by means of which the connection for supplying the electric heating element with current can be made, and wherein the unheated end section has a fill opening for the electrically insulating material. In this way, when using a resistive wire with a flat ribbon-shaped cross section, a particularly large-area electrical contacting to the pipe made from electrically conductive material can be realized.

The unheated area of the electric heating element thus forms an unheated transition area of the electric heater, in which, during operation of the electric heater, the electric current flows simultaneously both through the tubular section or the pipe made from electrically conductive material and also through the end section of the electric heating element connected in an electrically conductive way thereto. In other words, in the unheated transition area, there is a section of the electric heating element and at least one section of the pipe, wherein these sections are technically connected in parallel rather than in series.

The fill opening thereby permits, during the making of the electric heater, a direct filling of the coil interior defined by coiled sections of the electric heating element, with electrically insulating powder or granules, e.g., magnesium oxide, whereas up to now this material had to pass between coils of the electric heating element in order to reach this area, which caused problems for process-reliable filling, especially with small coil distances. To avoid misinterpretation, it should be noted that the fill opening is a structure in the unheated end section of the electric heating element and defined by the shaped coils and/or at least tubular sections of the pipe made from electrically conductive material, which can typically be filled with electrically insulating material in the finished electric heater.

By reshaping the coil, in particular, in a reshaping process that results in a reduction of the coil outer diameter, the distance to the tubular metal jacket can be increased in the radial direction, which is important for reducing problems in filling with the electrically insulating material in the area between the outside of the electric heating element and the tubular metal jacket. This is of particular relevance if the tubular section of the pipe made from electrically conductive material is arranged pushed onto the shaped coil(s), which can significantly increase the available conductor cross section compared with known solutions. But even if the tubular section of the pipe made from electrically conductive material is pushed onto the shaped coil(s), the reshaping can significantly improve the filling behavior when filling with electrically insulating material.

The tubular section can also be formed optionally by a section of a connecting pin, which contains a through hole for filling the electrically insulating materials. However, it can also be advantageous if at least one section of a connecting pin is inserted in a section of the tubular section of the pipe made from electrically conductive material, with this section of a connecting pin being penetrated by a fill opening for filling the electrically insulating materials, because this further increases the available conductive cross section.

In general, it should be recalled at this point that a pipe does not always have to have a circular cross section, but the cross section could also be, e.g., rectangular, oval, star-shaped, or asymmetrical.

It is particularly preferred, in the case of a pushed-on pipe, if the outer diameter of the tubular section of the pipe made from electrically conductive material corresponds to the outer diameter of the non-shaped coils of the electric heating element. In particular, this simplifies the electrical insulation to the tubular metal jacket, because then one or more corresponding single-hole pipes can be simply pushed on as preferably porous molded parts made from, e.g., C820.

It has proven particularly useful to match the pipe made from electrically conductive material and a flat ribbon material from which the electric heating element is produced to each other such that the wall thickness of the pipe is at least forty percent (40%) of the thickness of the flat ribbon material, preferably at least sixty percent (60%) and very particularly preferably at least eighty percent (80%).

The electric heater is particularly efficient in production when the shaped coils are shaped together with the tubular section of the pipe made from electrically conductive material, in particular, when the tubular section of the pipe made from electrically conductive material is compressed when it is pushed on.

When using a coiled resistive wire with a flat ribbon profile, the overall structure becomes much more stable and nothing collapses in the vertical position. Therefore, much smaller winding distances are also possible, because the windings do not collapse and contact each other before and during the filling process. This enables, in addition to accommodating a larger heat conductor cross section, a more optimal and larger surface area heat conduction to the outer jacket, because the heat-dissipating surface of the heat conductor is used optimally and there are only very small winding distances (e.g., maximum one-quarter percent (0.25%) of the ribbon thickness, in particular, maximum fifteen hundredths percent (0.15%) or even only one tenth percent (0.1%) of the ribbon thickness), both of which have a positive effect on the service life.

The compression of the tubular sections with shaped coils of end sections of the electric heating element produces a robust assembly that cannot be moved out of position by its own weight in the direction of extent of the electric heater.

In addition, the high stiffness and strength of the heating coil with pressed-on tubular sections at the ends make the automation much easier. Handling, gripping, and insertion processes are easier in terms of detecting, gripping, positioning, and transporting.

In addition, when using resistive wire with flat ribbon profile, the coils cannot become tangled when they are put together during intermediate storage, because the winding distances are too small.

Ribbon heating coils with pressed-on pipes can be excellently separated (e.g., by vibrations), conveyed, and fed, and thus easily integrated into an automated process. However, even with manual production, the solution according to the invention with pressed-on or pressed-in pipes has proven to have significantly better process reliability and to be faster, simpler, and more cost effective.

The manufacturing advantages associated with such a design, in addition to the accommodation of a large cross section at the ends and the process-reliable filling capability through or in a channel, are very big.

When multiple adjacent shaped coils are shaped such that their winding distance from each other is reduced in comparison with the winding distance between non-shaped coils, this further increases the contact surface area to the pipe and is maximized when they are short-circuited with each other directly (that is, not only via the pipe). In addition, in the case that they are short-circuited, the heating power generated in the connection area formed by the tubular section of the pipe made from electrically conductive material is further reduced.

The method according to the invention of making an electric heater with a tubular metal jacket and an electric heating element, which is arranged in the interior of the pipe-shaped metal jacket embedded in an electrically insulating material and is coiled at least in some sections, is distinguished in that an unheated end section is produced in that, on one hand, one or more coils of the electric heating element are shaped and, on the other hand, at least one tubular section of a pipe made from electrically conductive material is brought into electrical contact with shaped coils of the electric heating element, so that the unheated end section produced in this way has a fill opening for the electrically insulating material.

In one further development of the method, it is provided that the tubular section of the pipe made from electrically conductive material is brought into electric contact with shaped coils of the electric heating element, in that coils of a coiled section of the electric heating element are shaped and the tubular section of the pipe made from electrically conductive material is pushed onto the outside of this coiled section or is pushed in on the inside of this coiled section at least in some sections.

In a preferred further development of the method, the tubular section of the pipe made from electrically conductive material is compressed with the outside of the shaped section of the electric heating element, when it is pushed on or compressed with its inside when it is pushed in.

This takes place preferably outside of the tubular metal jacket and without any electrically insulating material already being present. Both of these factors contribute significantly to improved controllability and process reliability.

The method sequence is made especially efficient in that, during the compression of the tubular section of the pipe made from electrically conductive material with the outside and/or inside of the end section of the electric heating element, the reshaping of the coils of the coiled section, onto which the tubular section of the pipe made from electrically conductive material has been pushed and/or into which it has been pushed, is realized.

Preferably, the compression step is carried out such that after the compression, the outer diameter of the unheated end section produced in this way is equal to the outer diameter of non-shaped coils of the electric heating element.

If the electric heating element is introduced with the tubular sections of the pipe made from electrically conductive material pushed thereon or pushed therein and preferably already compressed as a common assembly into the tubular metal jacket, adverse effects on the electrically conductive connection between these components due to contamination with particles of the electrically insulating materials can be avoided.

Preferably, the electrically insulating material, in particular, magnesium oxide, is introduced into the interior of the tubular metal jacket as at least one molded part, in particular, a porous molded part, for example, made from C820 and/or ether as a powder or as granules. Here it is advantageous if at least one molded part is a pipe made from electrically insulating material pushed onto the assembly made from the electric heating element and tubular sections of the pipe made from electrically conductive material pushed there on or pushed therein and/or that the powder or granules are introduced through the coil interior of the coiled electric heating element into the interior of the tubular metal jacket.

In particular, a combination of both variants also allows very small winding distances to be used, which is preferably realized with flat ribbon material as the electrical resistive wire, in which the windings do not collapse and contact each other before and during the filling process. This enables, in addition to accommodating a larger heat conductor cross section, also a more optimal and larger surface area conduction of heat to the outer jacket, because the heat-dissipating surface of the heat conductor is used optimally and there are only very small winding distances, e.g., maximum one-quarter percent (0.25%) of the thickness of the flat ribbon material, in particular, maximum fifteen hundredths percent (0.15%) or even only one tenth percent (0.1%) of this ribbon thickness. With such small winding distances, however, the guarantee of proper penetration of the electrically insulating material into the interior of the coil is just as low for the previously typical filling with electrically insulating material via an annular gap as for a pure filling from the inside, through a fill opening for the electrically insulating material in the unheated end section of the electric heating element produced according to the invention.

If a part of the electric heating element and/or a part of the tubular metal jacket and/or a part of the electrically insulating material is cut with a tool, the length of the unheated sections can be freely configured as desired.

BRIEF DESCRIPTION OF THE SEVERAL VIEWS OF THE DRAWING

The foregoing summary, as well as the following detailed description of the preferred invention, will be better understood when read in conjunction with the appended drawings. For the purpose of illustrating the preferred invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
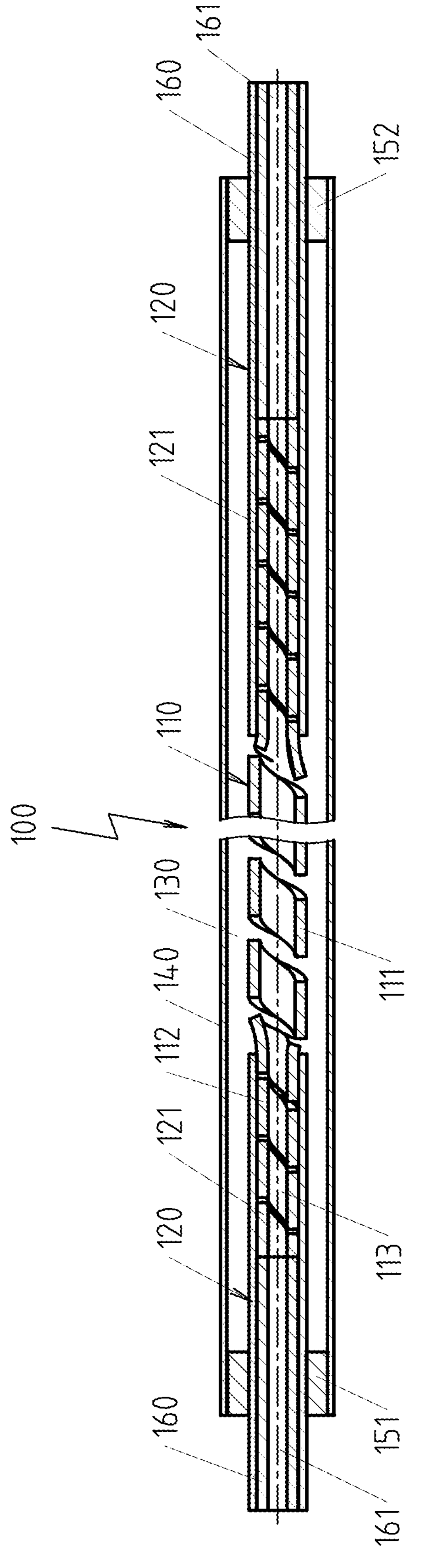
FIG. 1 is a longitudinal cross section through an electric heater in accordance with a first preferred embodiment of the present invention.

FIG. 1 shows a longitudinal cross section through an electric heater 100 of a first preferred embodiment with tubular metal jacket 140. In the interior of the tubular metal jacket 140 there is an electric heating element 110 coiled over its entire length with non-shaped coils 111 and shaped coils 112, which is electrically insulated from the tubular metal jacket 140 by electrically insulating material 130 with good heat conducting properties, for example, magnesium oxide. Power is supplied to the electric heating element 110 via the pipe 120, made from electrically conductive material, preferably copper, mild steel, nickel-plated mild steel, or nickel, which have a section 121 pushed on the outside of at least one shaped coil 112 of the electric heating element 110 and are compressed there, so that an unheated end section of the electric heating element 110 is produced, which has a fill opening 113 and is realized by means of the power supply of the electric heating element 110 in all embodiments.

The interior of the sections of the pipe 120 made from electrically conductive material adjacent to the sections 121 pushed on the outside of at least one shaped coil 112 of the electric heating element 110 is filled with a connecting pin 160 with an insertion opening 161 formed as a hole penetrating longitudinally through the pin, wherein this insertion opening is adjacent to the fill opening 113. The pipes 120 are passed through plugs 151,152, which each close the tubular metal jacket 140 on the end side, so that they can be connected to electrical supply lines. Due to the better conductivity of the pipes 120, power is supplied to the electric heating element 110 mainly through these pipes, although of course current can also flow through the shaped coils 112 compressed with them.

One first preferred embodiment of a production method for an electric heater 200 will now be presented with reference to FIGS. 2*a* to 2*h*.

Figures 2A, 2B, 2C, 2D:
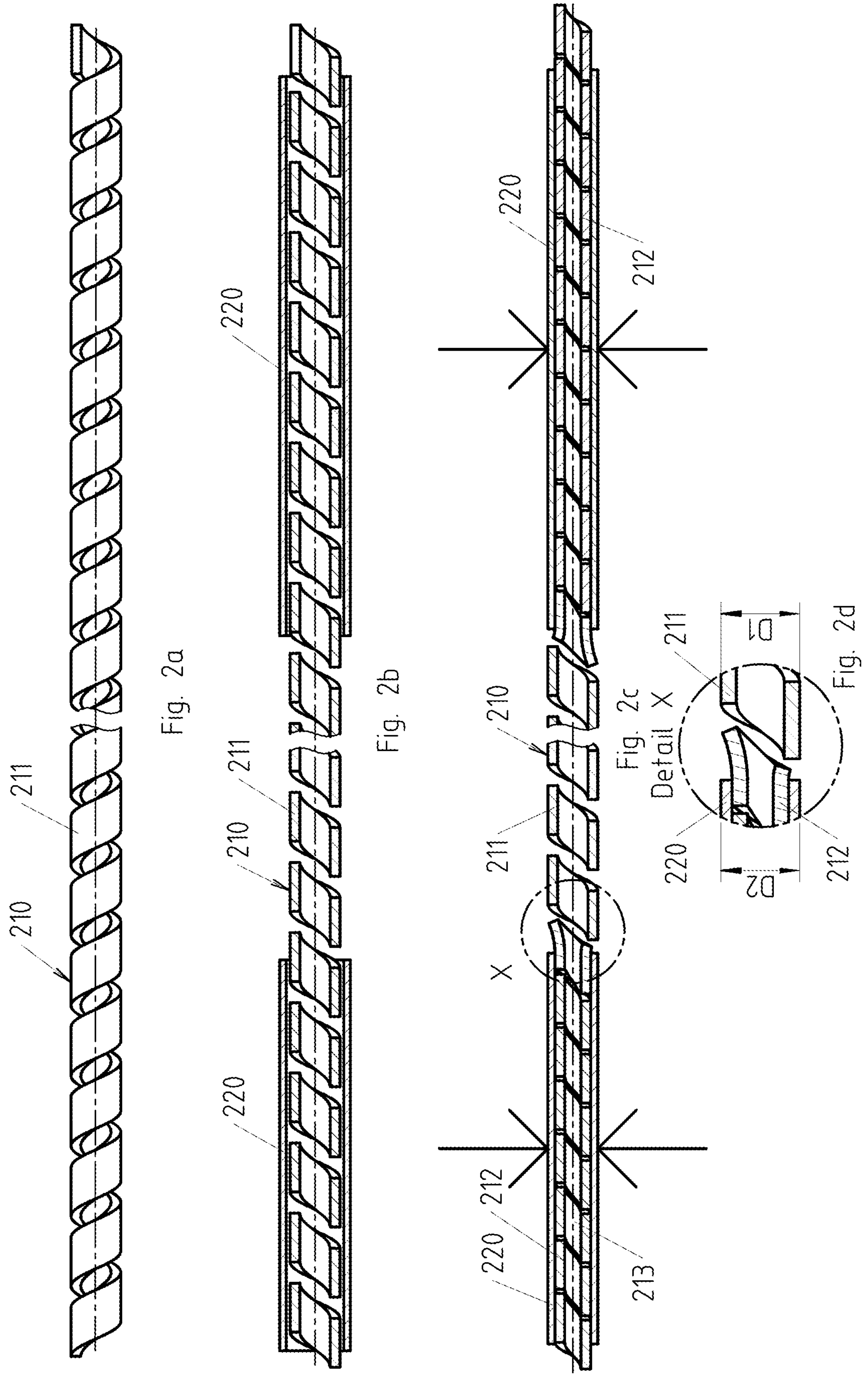
FIG. 2*a* is a side elevational view of an electric heating element in a first intermediate stage in the making of the electric heater of FIG. 1.
FIG. 2*b* is a longitudinal cross section through the electric heating element of FIG. 2*a* and pipes in a second intermediate stage in the making of the electric heater of FIG. 1.
FIG. 2*c* is a longitudinal cross section through the electric heating element and pipes of FIG. 2*b* in a third intermediate stage in the making of the electric heater of FIG. 1.
FIG. 2*d* is a longitudinal cross section, detail enlargement of the electric heating element and pipes of FIG. 2*b*, taken from within circle X of FIG. 2*c*.

FIG. 2*a* shows an electric heating element 210, which is coiled into coils 211 along its entire length and is provided as a first intermediate stage in the making of an electric heater. This electric heating element 210 preferably consisting of a flat ribbon material, in particular a resistive wire with a flat ribbon-shaped cross section, is preferably self-supporting, i.e., is dimensionally stable without the effect of external forces, and can be produced, for example, by coils of a resistive wire with round or flat profile but can also be cut out of a pipe or machined out of bar material.

Pipes 220, which are preferably made from a material with good electrically conductive properties, such as copper, mild steel, nickel-plated mild steel or nickel, are now pushed onto this coiled electric heating element—completely in the shown embodiment—which results in the configuration shown in FIG. 2*b*. In principle, the pipes 220 can also be formed by sections of a connecting pin, in which a hole is formed.

In a subsequent method step, the pipes 220 made from electrically conductive material are now pressed onto the outside of the coils, on which they have been pushed, which is symbolized by the arrows in FIG. 2*d*. Here, the pressing pressure is selected so high that shaped coils 212 are produced, which results in the intermediate stage shown in FIG. 2*c*, but only so high that a fill opening 213 remains. If shaped coils 212 are short-circuited with each other by the shaping, this is usually intentional, because typically as little heat as possible should be generated in the connection areas. However, as will be explained again below in more detail, it is important to maintain a continuous coil interior as the fill opening 213, if a fill opening 213 is not created in some other way, e.g., like in the embodiment discussed below with reference to FIGS. 7*a* to 7*d*.

As can be seen particularly well in the detailed view of FIG. 2*d*, it is preferred that after the compression, the outer diameter D2 of the pipe 220 made from electrically conductive material corresponds to the original outer diameter D1 of the coils 211, that is non-shaped coils, so that the assembly formed by compression from the electric heating element 210 and pipes 220 has essentially a constant diameter.

For this reason, it is also preferred, particularly in cases in which only one tubular section of the pipe 220 made from electrically conductive material is pressed onto the electric heating element, if the pipe 220 is filled uniformly during the compression, either through a section of the electric heating element 210 or, as in the embodiment of the electric heater 100 shown above, through a connecting pin pushed until contact with the end side of the electric heating element 110.

Figure 2E:
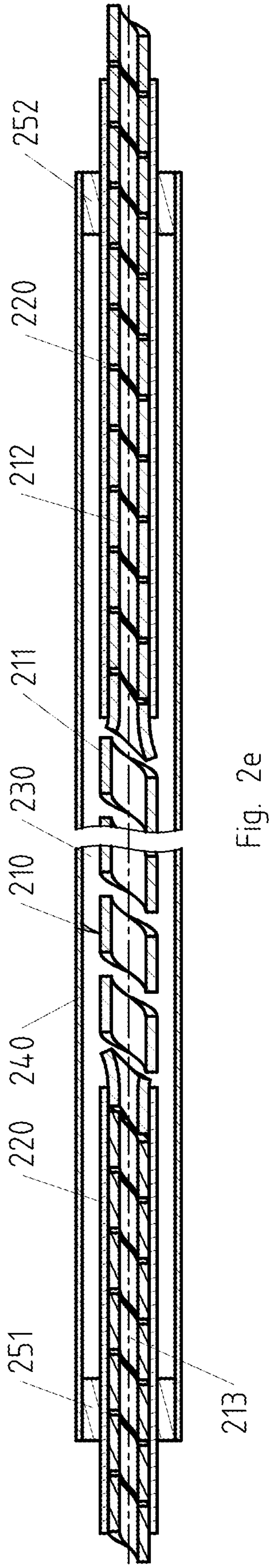
FIG. 2*e* is a longitudinal cross section through the electric heating element and pipes of FIG. 2*c* and a tubular metal jacket in a fourth intermediate stage in the making of the electric heater of FIG. 1.

The fourth intermediate stage shown in FIG. 2*e* is produced by inserting the assembly formed by the compression of pipes 220 made from electrically conductive material and electric heating element 210 with each other into the interior of a provided tubular metal jacket 240, closing it on one side with one of the plugs 251,252 and filling it with electrically insulating material 230, e.g., a magnesium oxide powder or granules, before then closing it with the second plug 252, 251. The electrically insulating material 230 can also be provided in whole or in part as one or more preferably porous molded parts, for example, single-hole pipes or in bar form made from C820 MgO, which can significantly simply, in particular, the filling of the electrically insulating material to be arranged between the outside of the electric heating element 210 and the tubular metal jacket 240.

Figure 2F:
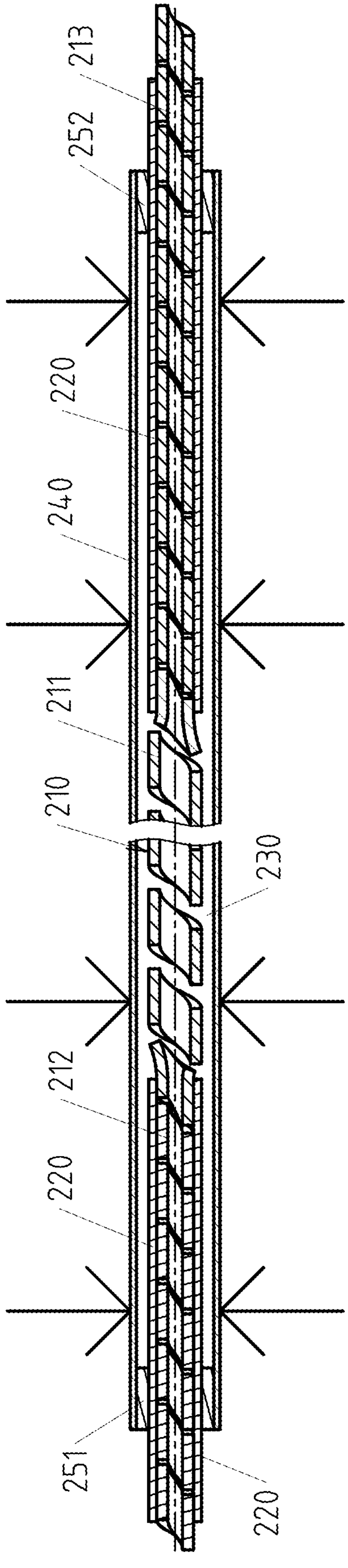
FIG. 2*f* is a longitudinal cross section of the heating element, pipes and tubular metal jacket of FIG. 2*e* in a fifth intermediate stage in the making of the electric heater of FIG. 1.

The fifth intermediate stage in the making of an electric heater, which is shown in FIG. 2*f*, comes from the fourth intermediate stage by means of compression, which is symbolized by the arrows in FIG. 2*f*.

Figure 2G:
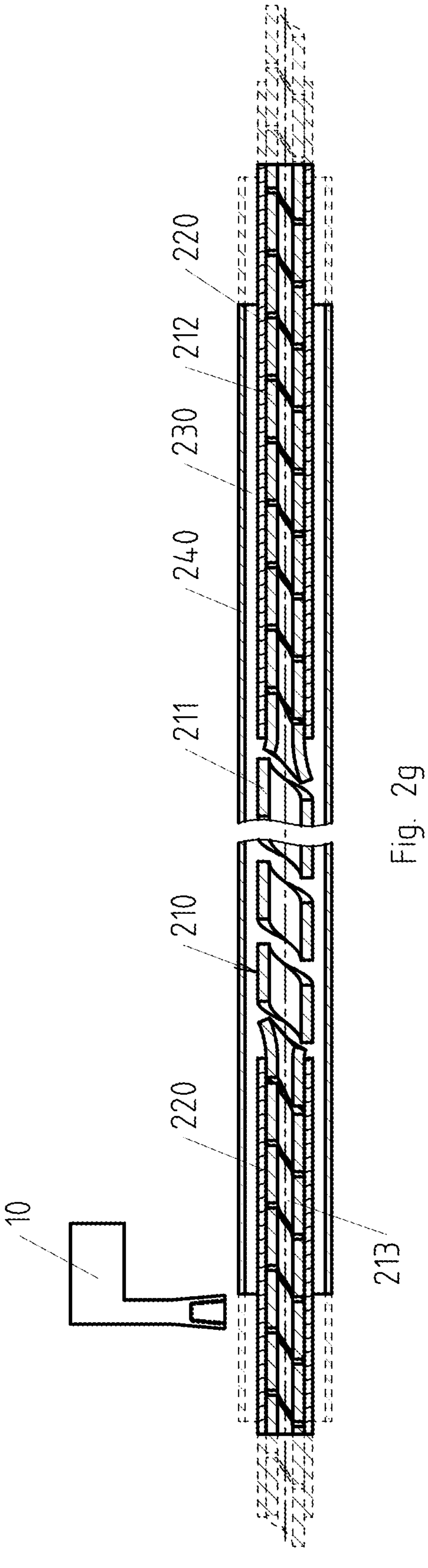
FIG. 2*g* is a longitudinal cross section of the heating element, pipes and tubular metal jacket of FIG. 2*e* in a sixth intermediate stage in the making of an electric heater of FIG. 1.

FIG. 2*g* shows a sixth intermediate stage in the making of an electric heater, which is produced through the use of a tool 10 to cut off parts of the electric heating element 210, in particular those that extend, as a consequence of elongation due to compression, beyond the connection-side end of the pipes 220 made from electrically conductive material and, if desired, also parts of the tubular metal jacket 240 and of the electrically insulating material 230 radially from the outside. In this way, in particular, the length of the unheated end sections of the electric heater 200, which are formed by the shaped coils 212 are adapted to the sections of the pipes 220 made from electrically conductive material compressed therewith.

Figure 2H:
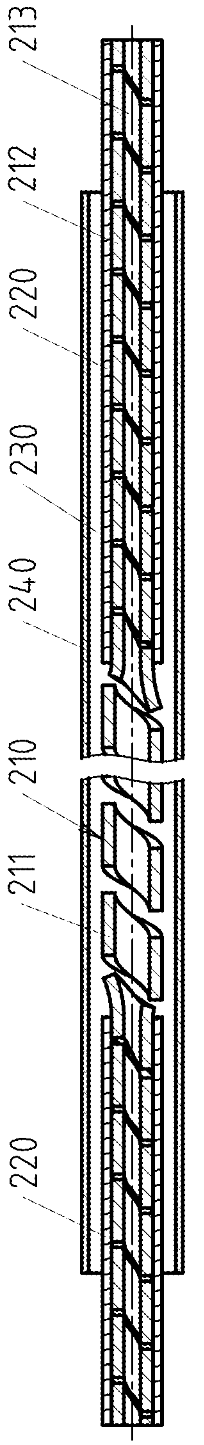
FIG. 2*h* is a longitudinal cross section of the finished electric heater of FIG. 1.

This then results in the finished electric heater 200 shown in FIG. 2*h*.

Figures 3A, 3B, 3C:
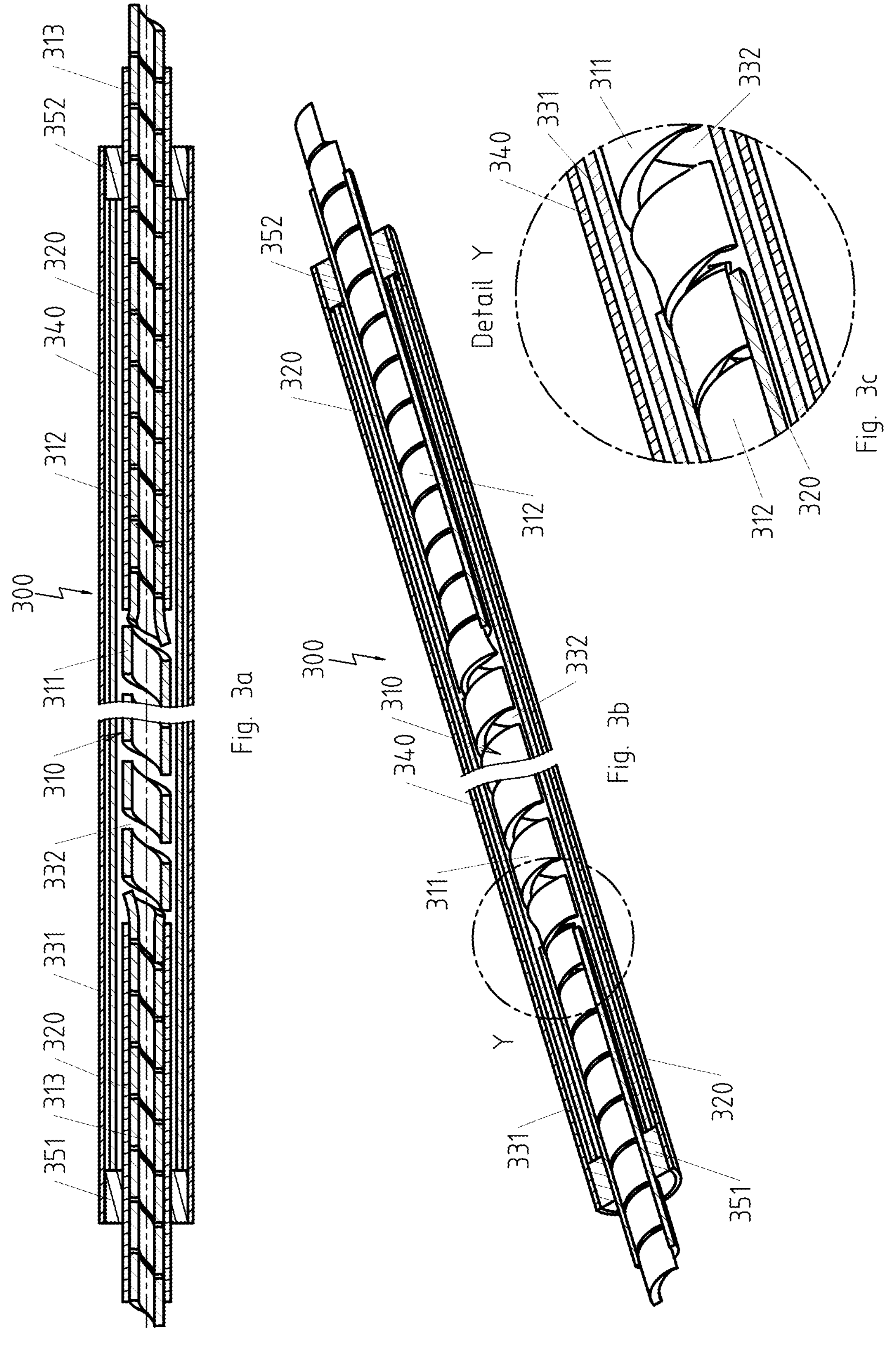
FIG. 3*a* is a longitudinal cross section through an electric heater in accordance with a second preferred embodiment of the present invention.
FIG. 3*b* is a longitudinal cross section of a side open illustration of the electric heater from FIG. 3*a,*
FIG. 3*c* is an enlarged longitudinal cross section of the electric heater of FIG. 3*a*, taken from within circle Y of FIG. 3*b,*

FIG. 3*a* shows a longitudinal section through an electric heater 300 with tubular metal jacket 340 of a second preferred embodiment; FIG. 3*b* shows the same electric heater 300 in an open view; and FIG. 3*c* shows a detail enlargement from FIG. 3*b* showing the structure in particular detail.

As in the first preferred embodiment according to FIG. 1, in the interior of the tubular metal jacket 340 of the second preferred embodiment there is an electric heating element 310 coiled over its entire length with non-shaped coils 311 and shaped coils 312, which is electrically insulated from the tubular metal jacket 340 by electrically insulating material that has good heat conducting properties.

The essential difference to the electric heater 100 of the first preferred embodiment according to FIG. 1 consists in that here the electrically insulating material is formed, on one hand, as a molded part 331 in the second preferred embodiment, more specifically a single-hole crush tube, which preferably consists of a porous electrically insulating material, e.g., C820, which is pushed onto the electric heating element 310 and the pipes 320 made from electrically conductive material, and, on the other hand, as a powder or as granules poured through the fill opening 313 into the coil interior of the coiled electric heating element 310, which largely eliminates filling problems that might otherwise occur when there are small distances between the electric heating element 310 and the tubular metal jacket 340.

Power is supplied to the electric heating element 310 mainly by means of pipes 320 made from electrically conductive material, preferably copper, mild steel, nickel-plated mild steel, or nickel, which are pushed here completely onto the outside of shaped coils 312 and compressed there, so that an unheated end section of the electric heating element is formed. The pipes 320 made from electrically conductive material are guided through the plugs 351,352, which close each end of the tubular metal jacket 340 so that they can be connected to electrical supply lines.

Figure 4C:
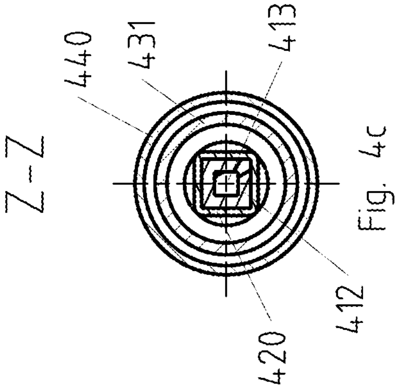
FIG. 4*c* is a lateral cross section through the electric heater from FIG. 4*a*, taken along line Z-Z of FIG. 4*a,*
Figure 4A:
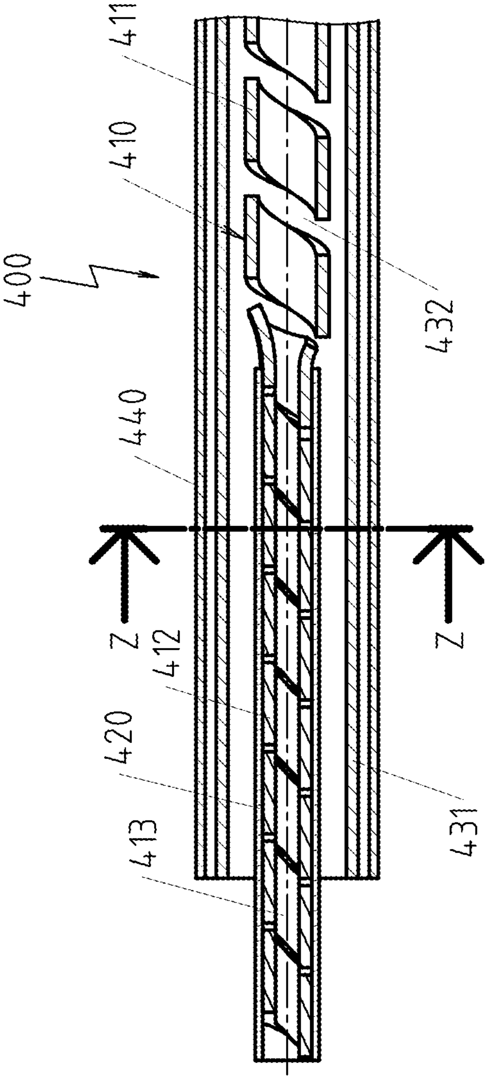
FIG. 4*a* is a longitudinal cross section through a partial illustration of an electric heater in accordance with a third preferred embodiment of the present invention.
Figure 4B:
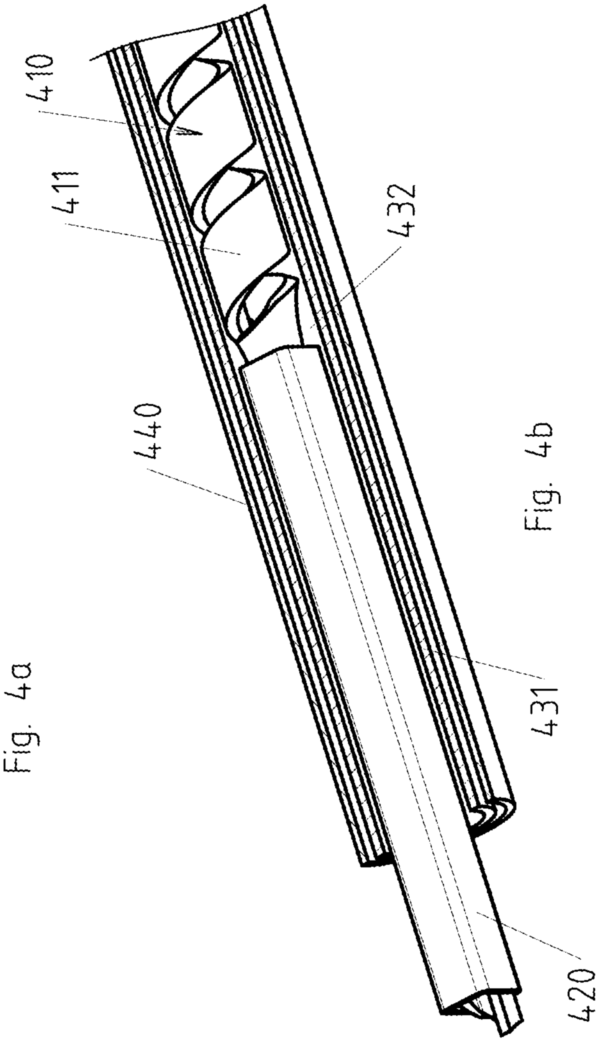
FIG. 4*b* is a longitudinal cross section of a side open partial illustration of the electric heater from FIG. 4*a,*

FIG. 4*a* shows a longitudinal section through one half of an electric heater 400 of a third preferred embodiment with tubular metal jacket 440; FIG. 4*b* shows the same half of the electric heater 400 in an open view; and FIG. 4*c* shows a cross section through such an electric heater 400 in its unheated end section. The complete electric heater 400 is produced by adding a section that is mirrored on a plane perpendicular to the direction of extent of the electric heater 400 and corresponds to the shown section.

The structure of the electric Heater 400 of the third preferred embodiment corresponds largely to that of the second preferred embodiment according to FIGS. 3*a* to 3*c*. In the interior of the tubular metal jacket 440 of the third preferred embodiment there is an electric heating element 410 coiled over its entire length with non-shaped coils 411 and shaped coils 412, which is electrically insulated from the tubular metal jacket 440 by electrically insulating material with good heat conducting properties, which is formed, on one hand, as a molded part 431, which preferably consists of a porous, electrically insulating material, e.g., C820, more specifically a single-hole crush tube, which is pushed onto the electric heating element 410 and the pipe 420 made from material with good electrically conductive properties, and, on the other hand, as a powder or as granules 432 poured through the fill opening 413 into the coil interior of the coiled electric heating element, which largely eliminates filling problems that might otherwise occur when there are small distances between the electric heating element 410 and the tubular metal jacket 440.

Power is supplied to the electric heating element 410 mainly by means of the pipes 420 made from electrically conductive material, preferably copper, mild steel, nickel-plated mild steel, or nickel, which are pushed here completely onto the outside of shaped coil 412 and compressed there. The pipes 420 made from electrically conductive material are extended out of the tubular metal jacket 440 on the end side, so that they can be connected to electrical supply lines.

The difference to the electric heater 300 of the second preferred embodiment consists in that for the electric heater 400 of the third preferred embodiment for the compression of the electric heating element 410 and the tubular section of the pipe 420 made from electrically conductive material, the pressing pressure was applied by four punches, each of which is perpendicular to the two adjacent punches, so that an unheated end section with a rectangular cross section and a rectangular fill opening 413 is produced, as can be seen particularly well in the cross-sectional illustration of FIG. 4*c*.

Figures 5A, 5B, 5C:
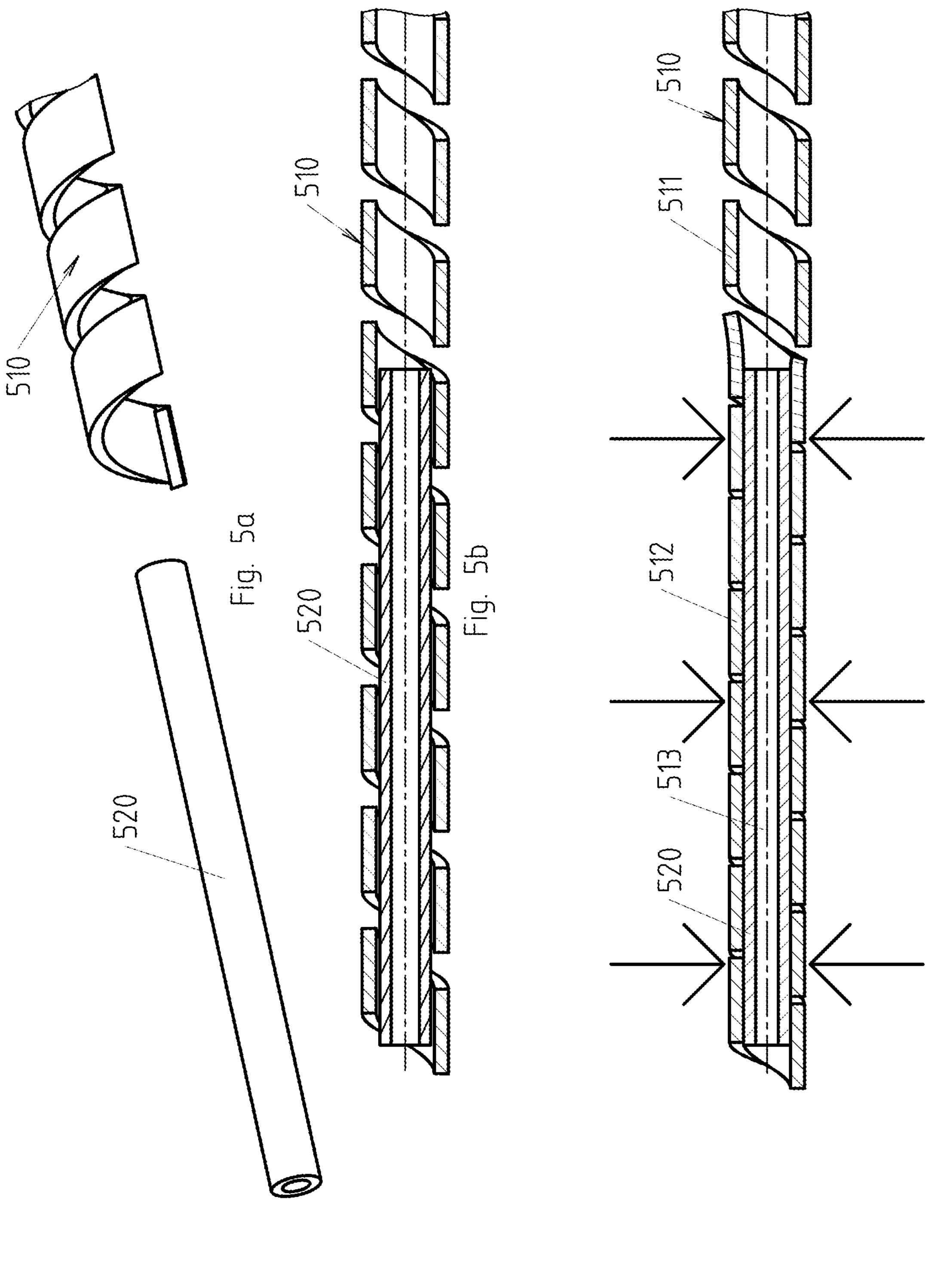
FIG. 5*a* is a side perspective view of a partial coiled electric heating element and a pipe of a first variant of an unheated end section of the preferred electric heaters.
FIG. 5*b* is a first intermediate step in the making of the first variant of the unheated end section.
FIG. 5*c* is a longitudinal cross section of the unheated end section of FIG. 5*b* as per the first variant.

FIGS. 5*a* to 5*c* show the components, an intermediate step in the production, and the produced unheated end section of a coiled electric heating element 510 in a first variant. Here, the unheated end section is formed such that a pipe 520 made from materials with good electrically conductive properties is pushed completely into the coil interior of coils 511 of an end section of the electric heating element 510 and then in a pressing process, in which these coils are shaped, so that shaped coils 512 are produced, a press contact is formed, so that an unheated end section of the electric heating element 510 with fill opening 513 is produced and the pipe 520 and the electric heating element 510 can be used to form an assembly connected to each other.

Figures 6A, 6B, 6C:
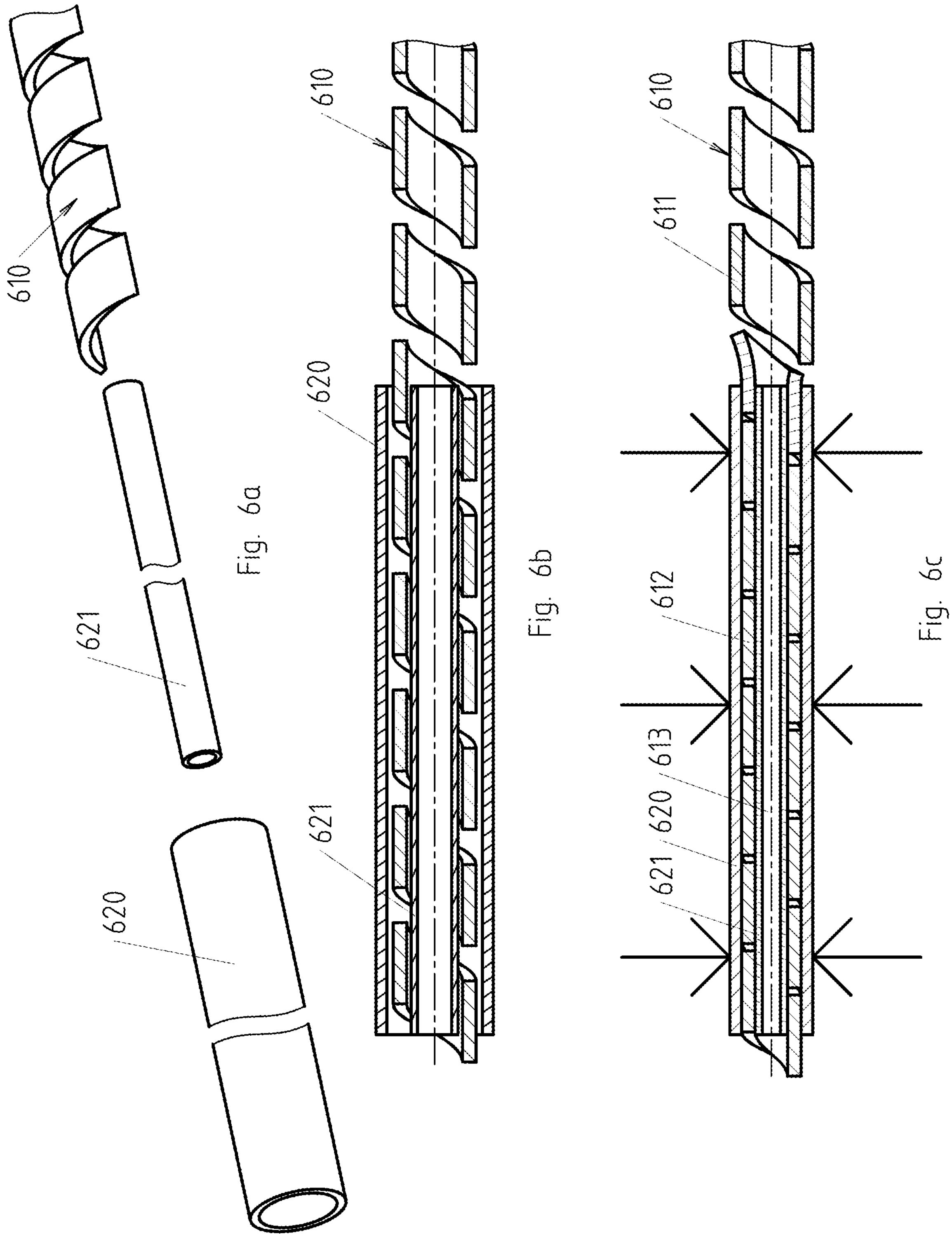
FIG. 6*a* is a side perspective view of a partial coiled electric heating element, a first pipe and a second pipe of a second variant of an unheated end section of the preferred electric heaters.
FIG. 6*b* is a longitudinal cross section of the partial coiled electric heating element, first pipe and second pipe of FIG. 6*a* in a first intermediate step in the making of the second variant of the unheated end section of the preferred electric heaters.
FIG. 6*c* is a longitudinal cross section of the partial coiled electric heating element, first pipe and second pipe of FIG. 6*a* in the unheated end section as per the second variant of the preferred electric heaters.

FIGS. 6*a* to 6*c* show the components, an intermediate step in the production, and the produced unheated end section of a coiled electric heating element 610 in a second variant. Here, the unheated end section is formed such that a first pipe 620 made from materials with good electrically conductive properties and a second pipe 621 made from materials with good electrically conductive materials are each pushed completely onto or into coils 611 of an end section of the electric heating element 610 and then, in a pressing process, in which these coils are shaped, so that shaped coils 612 are produced, a press contact is made, so that an unheated end section of the electric heating element 610 with fill opening 613 is produced.

In the embodiment of the electric heater 700 with tubular metal jacket 740, electric heating element 710, electrically conductive pipe 720, electrically insulating material 730, and plug 750, which is shown in FIGS. 7*a* to 7*d*, another variant of an unheated end section of the electric heating element 710, which is produced by compression with a pipe 720 made from materials with good electrically conductive properties, is used.

Figure 7A:
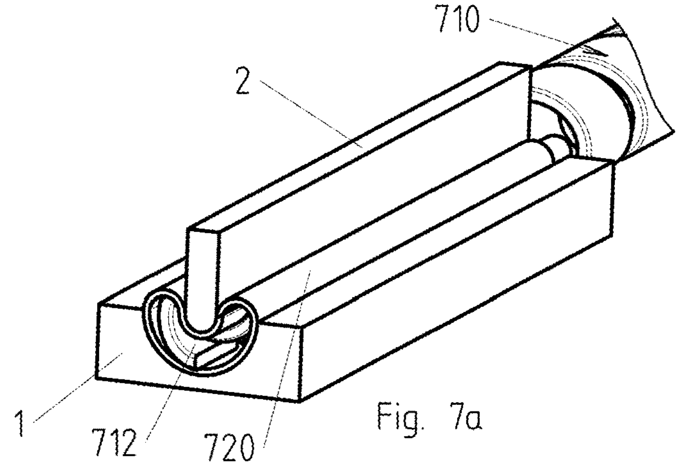
FIG. 7*a* is a first top perspective view of an intermediate step in the making of a third variant of the unheated end section of the preferred electric heaters.
Figure 7B:
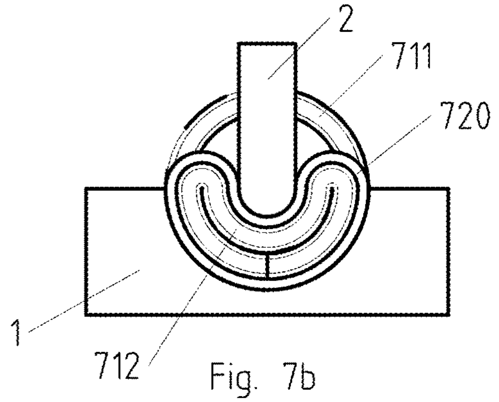
FIG. 7*b* is a side elevational view of the intermediate step in the making of the third variant of the unheated end section of the preferred electric heaters of FIG. 7*a,*
Figure 7C:
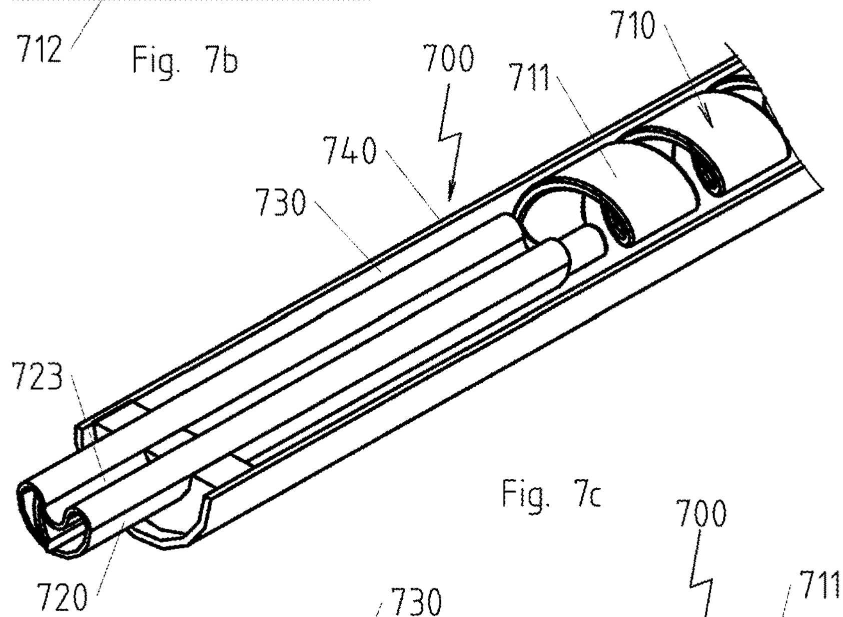
FIG. 7*c* is a top perspective, partial longitudinal cross section view of a part of an electric heater with an unheated end section as per the third variant of the unheated end section of FIG. 7*a*.
Figure 7D:
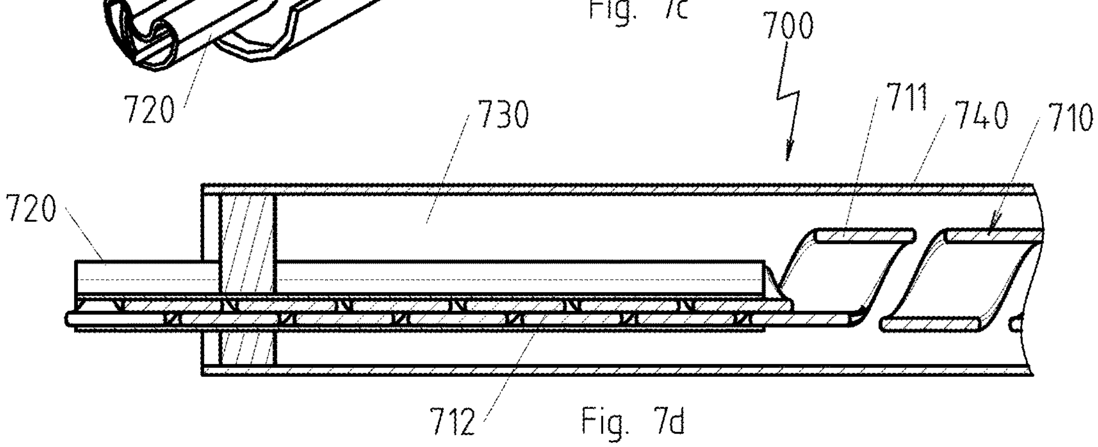
FIG. 7*d* is a front longitudinal cross section view of the part of the electric heater with unheated end section from FIG. 7*c*.

As can be seen, in particular, in FIGS. 7*a* and 7*b*, here the electric heating element 710 is placed in the die 1 with the pipe 720 made from materials with good electrically conductive properties pushed onto its end section and shaped with a punch 2 for compression in one direction, so that shaped coils 712 short-circuited to each other and shaped into a U-shape are produced and the pipe 720 compressed with these coils receives a U-shaped cross section.

The fill opening 713, which enables the central filling of the interior of the non-shaped coils 711 of the electric heating element 710 with electrically insulating powder or granules, for example, magnesium oxide, is then formed by the inner space of the U.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCE SYMBOLS

1 Die
2 Punch
10 Tool
100,200,300,400,700 Electric heater
110,210,310,410,510,610,710 Electric heating element
111,211,311,411,511,611,711 non-shaped coil
112,212,312,412,512,612,712 Shaped coil

113,213,313,413,513,613,713 Fill opening
120,220,320,420,520,620,720 Pipe
121 Section
130,230,330,730 Electrically insulating material
140,240,340,440,740 Tubular metal jacket
151,152,251,252,351,352,750 Plug
160 Connecting pin
161 Insertion opening
331,431 Molded part
432 Powder or granules
D1 Outer diameter
D2 Outer diameter of the pipe

The invention claimed is:

1. An electric heater comprising:

a tubular metal jacket;

an electric heating element, which is arranged embedded in an interior of the tubular metal jacket in an electrically insulating material and is coiled at least in some sections, the electric heating element having non-shaped coils with a first inner diameter, the electric heating element has a first unheated end section and a second unheated end section, wherein each of the first and second unheated end sections has shaped coils of the electric heating element with a second inner diameter; and a tubular section of a pipe made from an electrically conductive material, wherein the first inner diameter is larger than the second inner diameter, and wherein at least one of the first and second unheated end sections has a filling opening for the electrically insulating material, wherein the tubular section of the pipe is arranged on an outside of the first unheated end section of the electric heating element, such that the first unheated end section is located in an interior of the tubular section of the pipe, wherein an outer diameter of the tubular section of the pipe corresponds to an outer diameter of the non-shaped coil, the non-shaped coils disposed between the first and second unheated end sections.

2. The electric heater according to claim 1, wherein at least one section of a connecting pin, which is penetrated by an insertion opening, is inserted into the tubular section of the pipe.

3. The electric heater according to claim 1, wherein the shaped coils are shaped together with the tubular section of the pipe.

4. The electric heater according to claim 1, wherein multiple adjacent coils of the shaped coils are shaped such that a winding distance of the multiple adjacent coils is reduced compared to a winding distance between the non-shaped coils of the electric heating element or such that the multiple adjacent coils of the shaped coils are short circuited directly to each other.

5. A method of making an electric heater with a tubular metal jacket and an electric heating element, which is arranged embedded in an interior of the tubular metal jacket in an electrically insulating material and is coiled at least in some sections, the method comprising:

producing first unheated end section and a second unheated end section of the electric heater wherein coils of the electric heating element include non-shaped with a first inner diameter and shaped coils with a second inner diameter, the first inner diameter being larger than the second inner diameter, and a tubular section of a pipe made from an electrically conductive material is brought into electrical contact with the shaped coils of the electric heating element, so that the first and second unheated end sections are produced in this way, at least one of the first and second unheated end sections having a fill opening for the electrically insulating material, wherein each of the first and second unheated sections has the shaped coils of the electric heating element with the second inner diameter, the tubular section of the pipe is arranged on an outside of the first unheated end section of the electric heating element, such that the first unheated end section is located in an interior of the tubular section of the pipe, wherein an outer diameter of the tubular section of the pipe corresponds to an outer diameter of the non-shaped coil, the non- shaped coils disposed between the first and second unheated end sections.

6. The method according to claim 5, wherein the tubular section of the pipe made from the electrically conductive material is brought into electrical contact with the shaped coils of the electric heating element, in that the shaped coils are shaped and are pushed onto an outside of the coiled section or pushed into an inside of the coiled section at least in some sections before or after shaping of the at least one tubular section of the pipe.

7. The method according to claim 5, wherein the tubular section of the pipe is compressed with the first unheated end section.

8. The method according to claim 7, wherein in the step of compressing the tubular section of the pipe with the first end section of the electric heating element, coils are formed on which the tubular section of the pipe is pushed or into which the tubular section of the pipe is pushed.

9. The method according to claim 5, wherein the electric heating element is inserted with the tubular section pushed thereon or pushed therein as a common assembly into the tubular metal jacket.

10. The method according to claim 5, wherein the electrically insulating material is introduced as at least one molded part or as powder or granules into the interior of the tubular metal jacket.

11. The method according to claim 5, wherein a part of the electric heating element, a part of the tubular metal jacket or a part of the electrically insulating material is cut with a tool.

12. An electric heater comprising:

a tubular metal jacket; and an electric heating element, which is arranged embedded in an interior of the tubular metal jacket in an electrically insulating material and is coiled at least in some sections, the electric heating element having non-shaped coils with a first inner diameter, the electric heating element has a first unheated end section and a second unheated end section, wherein each of the first and second unheated end sections has shaped coils of the electric heating element with a second inner diameter and a tubular section of a pipe made from an electrically conductive material, wherein the first inner diameter is larger than the second inner diameter, and wherein at least one of the first and second unheated end sections has a filling opening for the electrically insulating material, wherein the tubular section of the pipe is arranged on an inside of the shaped coils of the electric heating element, such that the shaped coils are located on an exterior of the tubular section of the pipe, the non-shaped coils disposed between the first and second unheated end sections.

* * * * *